United States Patent
Ravichandran et al.

(10) Patent No.: US 11,617,124 B2
(45) Date of Patent: Mar. 28, 2023

(54) SYSTEMS AND METHODS FOR DETECTING USER TERMINAL DISPLACEMENT

(71) Applicant: Hughes Network Systems, LLC, Germantown, MD (US)

(72) Inventors: Akshay Giridhar Ravichandran, Germantown, MD (US); Satyajit Roy, Gaithersburg, MD (US); Rajeev Oza, Boyds, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 175 days.

(21) Appl. No.: 17/122,058

(22) Filed: Dec. 15, 2020

(65) Prior Publication Data

US 2022/0191767 A1    Jun. 16, 2022

(51) Int. Cl.
   *H04W 4/00*    (2018.01)
   *H04W 48/04*   (2009.01)
   *H04W 64/00*   (2009.01)
   *H04W 48/12*   (2009.01)

(52) U.S. Cl.
   CPC .......... *H04W 48/04* (2013.01); *H04W 48/12* (2013.01); *H04W 64/003* (2013.01)

(58) Field of Classification Search
   CPC .... H04W 48/04; H04W 48/12; H04W 64/003
   See application file for complete search history.

(56) References Cited

U.S. PATENT DOCUMENTS

| | | | | |
|---|---|---|---|---|
| 2003/0195983 | A1* | 10/2003 | Krause | H04L 49/356 709/238 |
| 2013/0232020 | A1* | 9/2013 | Liu | G06Q 20/206 705/18 |
| 2013/0339532 | A1* | 12/2013 | Nelson | H04L 67/04 709/228 |

* cited by examiner

*Primary Examiner* — Justin Y Lee
(74) *Attorney, Agent, or Firm* — Global IP Counselors, LLP (57) ABSTRACT

Systems and methods for detecting and preventing user terminal displacement are disclosed herein. In an embodiment, a method for managing access to a data network includes determining a baseline timing parameter based on at least one first communication signal transmitted between a gateway and a terminal, determining a current timing parameter based on at least one second communication signal transmitted between the gateway and the terminal, calculating the difference between the baseline timing parameter and the current timing parameter, and restricting access of the terminal to the data network when the difference between the baseline timing parameter and the current timing parameter exceeds a delay threshold.

20 Claims, 4 Drawing Sheets

SYSTEMS AND METHODS FOR DETECTING USER TERMINAL DISPLACEMENT

BACKGROUND

Field of the Invention

The present disclosure generally relates to systems and methods intended to prevent the relocation of a terminal connected to a terrestrial data network via a gateway. In particular, the present disclosure relates to systems and methods which use the amount of time for communication between the terminal and the gateway to determine whether the terminal has been improperly relocated and thereafter restrict access to the data network.

Background Information

Satellite communication systems have emerged as an option for users to establish communication to terrestrial data networks such as the Internet. Satellite communication systems typically utilize a terminal such as a very small aperture terminal (VSAT) at the user location. The VSAT allows users to access the terrestrial data networks. The VSAT is associated with a gateway or ground station which provides a point of connection to the terrestrial data networks for the satellite communication system.

SUMMARY

It has been discovered that some users move their terminals (e.g., VSATs) from an initial location to a new location without the approval of the provider of the terrestrial data network. For various reasons, such unapproved relocations can be problematic for the provider. For example, movement of a terminal can cause capacity planning or bandwidth resource usage planning issues or can violate a service agreement with a specific person or organization. In some cases, movement of a VSAT across state or country borders in an unauthorized manner can even circumvent legal or other restrictions. The present disclosure therefore provides improved systems and methods that detect the relocation of a terminal without the approval of the provider and thereafter restrict access to the terrestrial data network.

In view of the state of the known technology, one aspect of the present disclosure is to provide a method for managing access to a data network. The method includes determining a baseline timing parameter based on at least one first communication signal transmitted between a gateway and a terminal, determining a current timing parameter based on at least one second communication signal transmitted between the gateway and the terminal, calculating the difference between the baseline timing parameter and the current timing parameter, and restricting access of the terminal to the data network via the terminal when the difference between the baseline timing parameter and the current timing parameter exceeds a delay threshold.

Another aspect of the present disclosure is to provide another method for managing access to a data network. The method includes enabling a terminal located at a first location to access the data network via a gateway, after the terminal has accessed the data network from the first location, transmitting at least one communication signal between the gateway and the terminal, determining that the terminal has been moved to a second location based on a timing parameter determined using the at least one communication signal, and restricting access of the terminal to the data network from the second location.

Another aspect of the present disclosure is to provide a communication network. The communication network includes a terminal and a gateway. The terminal is located in a first location. The gateway is in remote communication with the terminal. The gateway is configured to enable the terminal to access a data network. A controller is configured to (i) determine that the terminal has been moved to a second location based on a timing parameter determined from at least one communication signal transmitted between the gateway and the terminal, and (ii) cause access of the terminal to the data network to be restricted from the second location.

Also, other objects, features, aspects and advantages of the disclosed satellite communication systems and methods will become apparent to those skilled in the art in the field of satellite communication from the following detailed description, which, taken in conjunction with the annexed drawings, discloses preferred embodiments of satellite communication systems and methods with various features.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
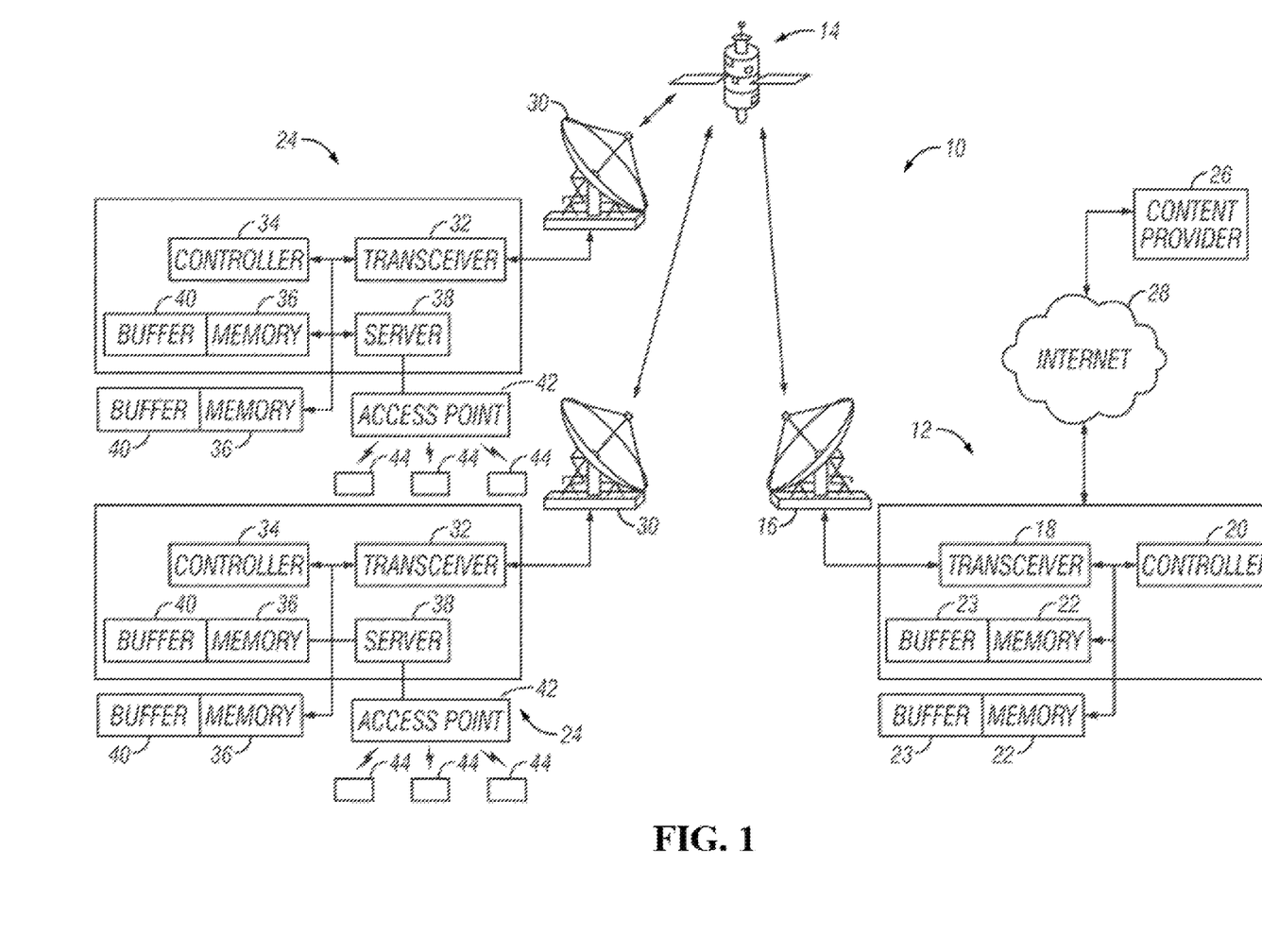
FIG. 1 illustrates an example embodiment of a satellite communication network according to the present disclosure.

FIG. 1 illustrates an example embodiment of a satellite communication network 10 in accordance with the present disclosure. A satellite communication network 10 typically includes a plurality of terrestrially mounted gateways 12 that communicate with one or more orbiting satellites 14. Each gateway 12 can include an antenna dish 16, a transceiver 18, a controller 20, a memory 22 and other types of equipment (not shown) such as amplifiers, waveguides and so on as understood in the art which enable communication between the gateway 12 and a plurality of terminals 24 via one or more of the orbiting satellites 14. The memory 22 can be, for example, an internal memory in the gateway 12, or other type of memory devices such as flash memory or hard drives with external high speed interface such as a USB bus or an SATA bus, or remote memories such as cloud storage and so on. These other types of memory can be present at the gateway 12 or accessible at a location apart from the gateway 12 via a network connection such as an Ethernet connection, a WiFi connection or any other suitable type of connection as understood in the art. Also, the memory 22 can include at least one buffer 23 which is configured to buffer, for example, packets to be sent by the gateway 12.

As understood in the art, the controller 20 preferably includes a microcomputer with a control program that controls the gateway 12 as discussed herein. The controller 20 can also include other conventional components such as an input interface circuit, an output interface circuit, and storage devices such as a ROM (Read Only Memory) device and a RAM (Random Access Memory) device. The RAM and ROM store processing results and control programs that are run by the controller 20. The controller 20 is operatively coupled to the components of the gateway 12 as appropriate, in a conventional manner. It will be apparent to those skilled in the art from this disclosure that the precise structure and algorithms for the controller 20 can be any combination of hardware and software that will carry out the functions of the present invention.

The gateway 12, the satellite 14 and the terminals 24 typically communicate with each other over a radio frequency link, such as a Ku-band link, a Ka-band link or any other suitable type of link as understood in the art, which can generally be referred to as a space link. In an embodiment, the gateway 12 can include or be configured as an inroute group manager (IGM) 46 (FIG. 2), which can be configured to control the bandwidth allocations to the terminals 24 (e.g., on an inroute or inroute group basis), and to correspondingly control and administer the bandwidth allocation approaches. Also, one or more gateway 12 can include or be configured as a network management system (NMS) 48 (FIG. 2), which, among other things, operates to communicate with remote sites, such as web content providers 26, via the Internet 28, cloud storage, or other communication networks as understood in the art. In addition, the gateways 12 can communicate with each other via, for example, the Internet 28 or other communication networks.

The satellite communication network 10 can include a plurality of terminals 24. As shown in FIG. 1, a terminal 24 typically includes an antenna dish 30, a transceiver 32, a controller 34, a memory 36, a local server 38 and other types of equipment (not shown) such as amplifiers, waveguides and so on as understood in the art which enable communication between the terminal 24 and one or more gateways 12 via one or more of the orbiting satellites 14. A transceiver 32 can include, for example, an integrated satellite modem and any other suitable equipment which enables the transceiver 32 to communicate with one or more of the orbiting satellites 14 as understood in the art. The memory 36 can be, for example, an internal memory in the terminal 24, or other type of memory devices such as a flash memory or hard drives with external high speed interface such as a USB bus or an SATA bus, or remote memories such as cloud storage and so on. These other types of memory can be present at the terminal 24 or accessible at a location apart from the terminal 24 via a network connection such as an Ethernet connection, a WiFi connection or any other suitable type of connection as understood in the art. Moreover, the memory 36 can include at least one buffer 40 which is configured to buffer, for example, received data packets included in communication signals transmitted from the gateway 12. Also, the local server 38 can communicate with an access point 42, such as a wireless application protocol (WAP) or any other suitable device, which enables the local server 38 to enable end user devices 44 to access the data network, for example, via data packets. Such end user devices 44 include, for example, desktop computers, laptop or notebook computers, tablets (e.g., iPads), smart phones, smart TVs and any other suitable devices as understood in the art. Naturally, the communications between the local server 38, the access point 42 and the end user devices 44 can occur over wireless connections, such as WiFi connections, as well as wired connections as understood in the art.

As with the controller 20 for a gateway 12, the controller 34 preferably includes a microcomputer with a control program that controls the terminal 24 as discussed herein. The controller 34 can also include other conventional components such as an input interface circuit, an output interface circuit, and storage devices such as a ROM (Read Only Memory) device and a RAM (Random Access Memory) device. The RAM and ROM store processing results and control programs that are run by the controller 34. The controller 34 is operatively coupled to the components of the terminal 24 as appropriate, in a conventional manner. It will be apparent to those skilled in the art from this disclosure that the precise structure and algorithms for the controller 34 can be any combination of hardware and software that will carry out the functions of the present invention.

In an embodiment, the terminal 24 can be a very small aperture terminal (VSAT) with a downlink/uplink transceiver 32. Each VSAT can serve a plurality of end user devices 44 such as desktop computers, laptop or notebook computers, tablets (e.g., iPads), smart phones, smart TVs and any other suitable devices. More specifically, each VSAT can enable the plurality of end user devices 44 to access a data network such as the Internet 28 via the gateway 12. The VSAT can also enable an end user device 44 to access the data network to obtain a satellite service such as cable television.

The terminal 24 is generally approved by the provider of the network 10 for installation in a first location (e.g., an initial location). Thus, the terminal 24 is enabled to access the data network from the first location via the gateway 12, which is in remote communication with the terminal 24. However, some users will relocate a terminal 24 from its first location to a second location (e.g., a new physical location) without approval from the provider of the network 10. The network 10 is therefore configured in accordance with the methods discussed herein to limit data service to a terminal 24 which is physically moved from a first location without the approval of the provider. More specifically, the network 10 is configured to detect when the terminal 24 has been moved from the first location. The network 10 can detect the movement using timing information from communication signals transmitted between the gateway 12 and the terminal 24 via the satellite 14. When movement from the first location is detected, the network 10 can restrict access to the data network. The network 10 can restrict access, for example, by partially limiting or fully suspending access to the data network from the terminal 24.

The gateway 12 and the terminal 24 communicate via communication signals relayed via the satellite 14. For example, the gateway 12 can send an outroute communication signal to the terminal 24 via the satellite 14. The outroute communication signal can include a channel allocation assignment for the terminal 24 to use during an upcoming time interval. The outroute signal can also include timing marker information to be used to determine the time segments discussed in more detail below. The terminal 24 can receive the outroute communication signal via the satellite 14. The terminal 24 can then send an inroute communication signal back to the gateway via the satellite 14. More specifically, the terminal 24 can use the channel allocation assignment during the appropriate time interval to send the inroute communication signal back to the gateway 12 via the satellite 14. The inroute communication signal can also include timing marker information to be used to determine the time segments discussed in more detail below.

The network 10 can use various signal protocols to exchange communication signals between the gateway 12 and the terminal 24 via the satellite 14. In an embodiment, the network 10 can use a Time-Division Multiple Access (TDMA) signal protocol. As will be understood by those of ordinary skill in the art from this disclosure, TDMA is a channel access method for shared-medium networks in which data bursts are transmitted within a narrow time window (e.g., an aperture). TDMA requires that the terminal 24 (e.g., VSAT) transmit data bursts to the gateway 12 via the satellite 14 such that the bursts start within the narrow time window with reference to a frame at the gateway 12. For the terminal 24 to establish a time reference in microseconds of the gateway's 12 time reference, the terminal 24 can receive feedback through a Superframe Numbering Packet (SFNP) from the gateway 12. Thus, a communication signal can include an SFNP.

The TDMA synchronization can rely on SFNP packets arriving at the terminal 24 at regular time intervals via outroute communication signals. The frame and timeslot used by the terminal 24 are assigned to the terminal 24 by the gateway 12 (e.g., by the IGM 46). The terminal 24 can then transmit the inroute communication signal using the appropriate frame during the assigned timeslot. The allocation of the timeslots from the gateway 12 to the terminal 24 can be made relative to a timing marker included in the outroute communication signal. The terminal 24 can use the timing marker to calculate the time to be applied to the burst to be transmitted back to the gateway 24. The terminal 24 can also use the timing marker in accordance with the methods discussed herein, as described in more detail below.

In an embodiment, the network 10 can operate using the ALOHA System or a similar networking system. More specifically, the terminal 24 can use large ALOHA transmissions to adjust the timing offset based on feedback received from the gateway 12 and a calculated remote-satellite-remote propagation time ($T_{RSR}$) before it starts using stream allocations.

Figure 2:
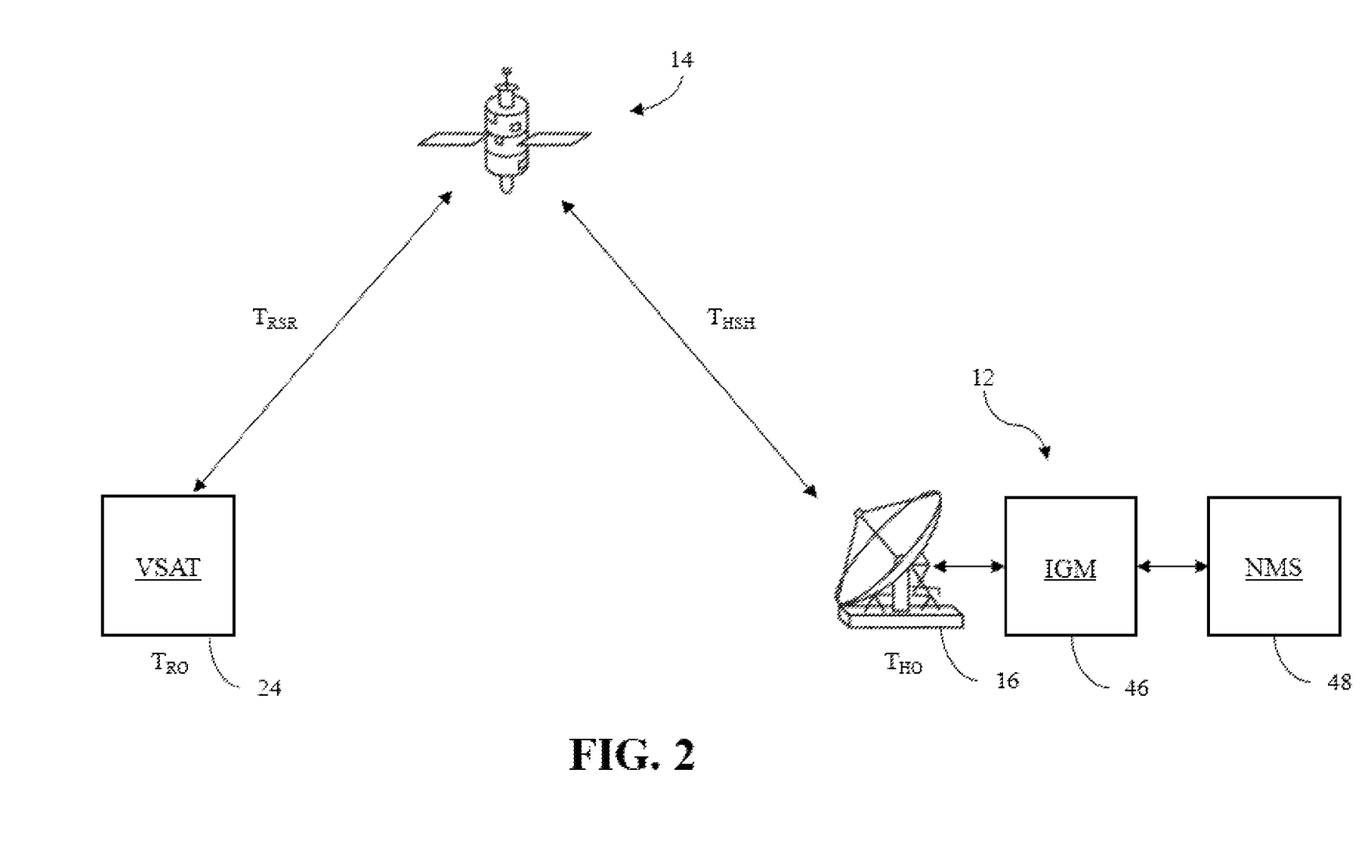
FIG. 2 illustrates an example embodiment of timing parameters that can be determined by the satellite communication network of FIG. 1.
Figure 3:
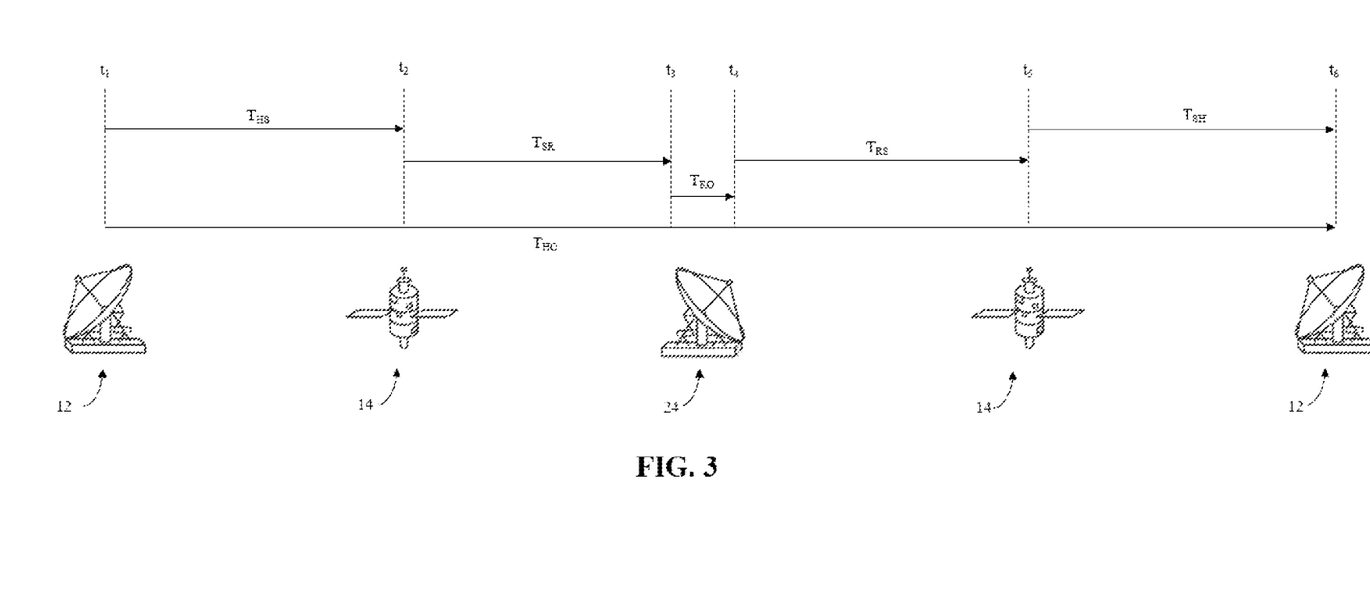
FIG. 3 further illustrates the timing parameters of FIG. 2.

FIGS. 2 and 3 illustrate at least one communication signal (e.g., including an SFNP) being sent from the gateway 12, to the terminal 24 via the satellite 14, and back to the gateway 12 via the satellite 14. More specifically, FIGS. 2 and 3 illustrate at least one communication signal which includes an outroute communication signal being sent from the gateway 12 to the terminal 24 via the satellite 14 and an inroute communication signal being returned from the terminal 24 to the gateway 12 via the satellite 14. Using the timing marker information from these communication signals, the network 10 (e.g., the controller 20 of the gateway 12 and/or the controller 34 of the terminal 24) can determine the illustrated time segments. It should be understood from this disclosure that the terms and abbreviations used for the time segments in FIGS. 2 and 3 are for illustration only and can be varied without departing from the spirit and scope of the present disclosure.

Several time segments can be determined based on at least a communication signal transmitted between the gateway 12 (e.g., the hub) and the terminal 24 (e.g., the remote). More specifically, several time segments can be determined from the timing marker information. FIGS. 2 and 3 illustrate the following time segments: (i) the hub offset time ($T_{HO}$); (ii) the remote offset time ($T_{RO}$); (iii) the hub-satellite (H-S) propagation time ($T_{HS}$); (iv) the satellite-remote (S-R) propagation time ($T_{SR}$); (v) the remote-satellite (R-S) propagation time ($T_{RS}$); (vi) the satellite-hub (S-H) propagation time ($T_{SH}$); (vii) the hub-satellite-hub (H-S-H) propagation time ($T_{HSH}$), which is the sum of the H-S propagation time ($T_{HS}$) and the S-H propagation time ($T_{SH}$); and (viii) the remote-satellite-remote (R-S-R) propagation time ($T_{RSR}$), which is the sum of S-R propagation time ($T_{SR}$) and the R-S propagation time ($T_{RS}$). Each of these time segments is discussed in more detail below.

FIG. 3 illustrates at least one communication signal being sent from the gateway 12, to the terminal 24, and back to the gateway 12 during a time $t_1$ to a time $t_6$. The at least one communication signal can include an outroute communication signal transmitted from the gateway 12 to the terminal 24 via the satellite 14 from the time $t_1$ to the time $t_3$, and an inroute communication signal transmitted from the terminal 24 to the gateway 12 via the satellite 14 from the time $t_4$ to the time $t_6$. Here, the hub offset time ($T_{HO}$) is the total time between the time $t_1$ and the time $t_6$.

At time $t_1$, at least one communication signal is transmitted from the gateway 12. The at least one communication signal can include an outroute communication signal with a data packet. The data packet can include timing marker information. The data packet can also mark a frame and/or provide a timeslot for an inroute communication signal from the terminal 24. The data packet can be an SFNP and mark a frame N.

At time $t_2$, the at least one communication signal is received by the satellite 14 and directed to the terminal 24. More specifically, the outroute communication signal is received by the satellite 14 and directed to the terminal 24. The time segment between the time $t_1$ and the time $t_2$ is the H-S propagation time ($T_{HS}$). Thus, the H-S propagation time ($T_{HS}$) can be considered the time taken for the at least one communication signal to transmit from the gateway 12 to the satellite 14.

At time $t_3$, the at least one communication signal is received by the terminal 24. More specifically, the outroute communication signal is received by the terminal 24. The time segment between the time $t_2$ and the time $t_3$ is the S-R propagation time ($T_{SR}$). Thus, the S-R propagation time ($T_{SR}$) can be considered the time taken for the at least one communication signal to transmit from the satellite 14 to the terminal 24.

At time U, the at least one communication signal is transmitted from the terminal 24 back to the satellite 14. More specifically, an inroute communication signal is transmitted from the terminal 24 back to the satellite 14. The inroute communication signal can include timing marker information. The time segment between the time $t_3$ and the time $t_4$ is the remote offset time ($T_{RO}$). The terminal 24 will have a value for the remote offset time ($T_{RO}$) that is accurate enough for the terminal 24 to be able to transmit in small aperture bursts within the assigned timeslot. Thus, the remote offset time ($T_{RO}$) can be considered the time taken for the terminal 24 to send the inroute communication signal in response to receiving the outroute communication signal. More specifically, the remote offset time ($T_{RO}$) can be considered the time between receipt of the SFNP that marks frame N at the terminal 24 and the start of transmission from the terminal 24 for frame N. In an embodiment, the remote offset time ($T_{RO}$) can be calculated as follows:

$$T_{RO} = T_{HO} - T_{HSH} - T_{RSR}.$$

At time $t_5$, the at least one communication signal is received by the satellite 14 and directed to the gateway 12. More specifically, the inroute communication signal is received by the satellite 14 and directed to the gateway 12. The inroute communication signal can be transmitted to the gateway 12 using frame N at the assigned timeslot. The time segment between the time $t_4$ and the time $t_5$ is the R-S propagation time ($T_{RS}$). Thus, the R-S propagation time ($T_{RS}$) can be considered the time taken for the at least one communication signal to transmit from the terminal 24 to the satellite 14.

At time $t_6$, the at least one communication signal is received by the gateway 12. More specifically, the inroute communication signal is received by the gateway 12. The inroute communication signal can be received using frame N. The time segment between the time $t_5$ and the time $t_6$ is the S-H propagation time ($T_{SH}$). Thus, the S-H propagation time ($T_{SH}$) can be considered the time taken for the at least one communication signal to transmit from the satellite 14 to the gateway 12.

The hub offset time ($T_{HO}$) can be calculated as the time segment between the time $t_1$ and the time $t_6$. Thus, the hub offset time ($T_{HO}$) can represent the time interval between the instant of transmission of the outroute communication signal from the gateway 12 to the instant of reception of the inroute communication signal at the gateway 12. More specifically, the hub offset time ($T_{HO}$) can represent the time interval between the instant of transmission of the SFNP that marks frame N from the gateway 12 to the reception using frame N at the gateway 12.

The H-S-H propagation time ($T_{HSH}$) can be considered the time that the at least one communication spent between the gateway 12 and the satellite 14. Thus, the H-S-H propagation time ($T_{HSH}$) can be determined using the H-S propagation time ($T_{HS}$) and/or the S-H propagation time ($T_{SH}$). More specifically, the H-S-H propagation time ($T_{HSH}$) can be calculated as the sum of the H-S propagation time ($T_{HS}$) from the time $t_1$ to the time $t_2$ and the S-H propagation time ($T_{SH}$) from the time $t_5$ to the time $t_6$. For example, the H-S-H propagation time ($T_{HSH}$) can be calculated as follows:

$$T_{HSH} = T_{HS} + T_{SH}.$$

In another embodiment, the H-S-H propagation time ($T_{HSH}$) can be estimated as twice the H-S propagation time ($T_{HS}$) from the time $t_1$ to the time $t_2$, or as twice the S-H propagation time ($T_{SH}$) from the time $t_5$ to the time $t_6$.

The H-S-H propagation time ($T_{HSH}$) can also be referred to as the round-trip propagation time (RTT) between the gateway 12 and the satellite 14. In an embodiment, the controller 34 of the terminal 24 can determine the H-S-H propagation time ($T_{HSH}$) from the SFNP received via the outroute communication signal. In an embodiment using a network 10 with satellite ephemeris information available for the satellite 14, the network 10 can calculate the H-S-H propagation time ($T_{HSH}$) based on the satellite ephemeris information. In an embodiment without satellite ephemeris information, the gateway 12 can periodically update an estimated H-S-H propagation time ($T_{HSH}$) by monitoring the overall drift of timing of all of the terminals 24 using polling responses, for example, forwarded by the IGM 46. It should therefore be understood from this disclosure that the R-S-R propagation time ($T_{RSR}$) calculated using the H-S-H propagation time ($T_{HSH}$), as described in more detail below, can have a small degree of error due to potential inaccuracy of an estimated H-S-H propagation time ($T_{HSH}$).

The R-S-R propagation time ($T_{RSR}$) can be considered the time that the at least one communication signal spent between the terminal 24 and the satellite 14. Thus, the R-S-R propagation time ($T_{RSR}$) can be determined using the S-R propagation time ($T_{SR}$) and/or the R-S propagation time ($T_{RS}$). More specifically, R-S-R propagation time ($T_{RS}$) can be calculated as the sum of the S-R propagation time ($T_{SR}$) from the time $t_2$ to the time $t_3$ and the R-S propagation time ($T_{RS}$) from the time $t_4$ to the time $t_5$. For example, R-S-R propagation time ($T_{RS}$) can be calculated as follows:

$$T_{RSR} = T_{SR} + T_{RS}.$$

The R-S-R propagation time ($T_{RSR}$) can also be referred to as the RTT propagation time between the satellite 14 and terminal 24.

Using the above terms, the hub offset time ($T_{HO}$) can calculated as follows:

$$T_{HO} = T_{HSH} + T_{RSR} + T_{RO}; \text{ or}$$

$$T_{HO} = (T_{HS} + T_{SH}) + (T_{SR} + T_{RS}) + T_{RO}.$$

The hub offset time ($T_{HO}$) can be generally constant for a given system.

Figure 4:
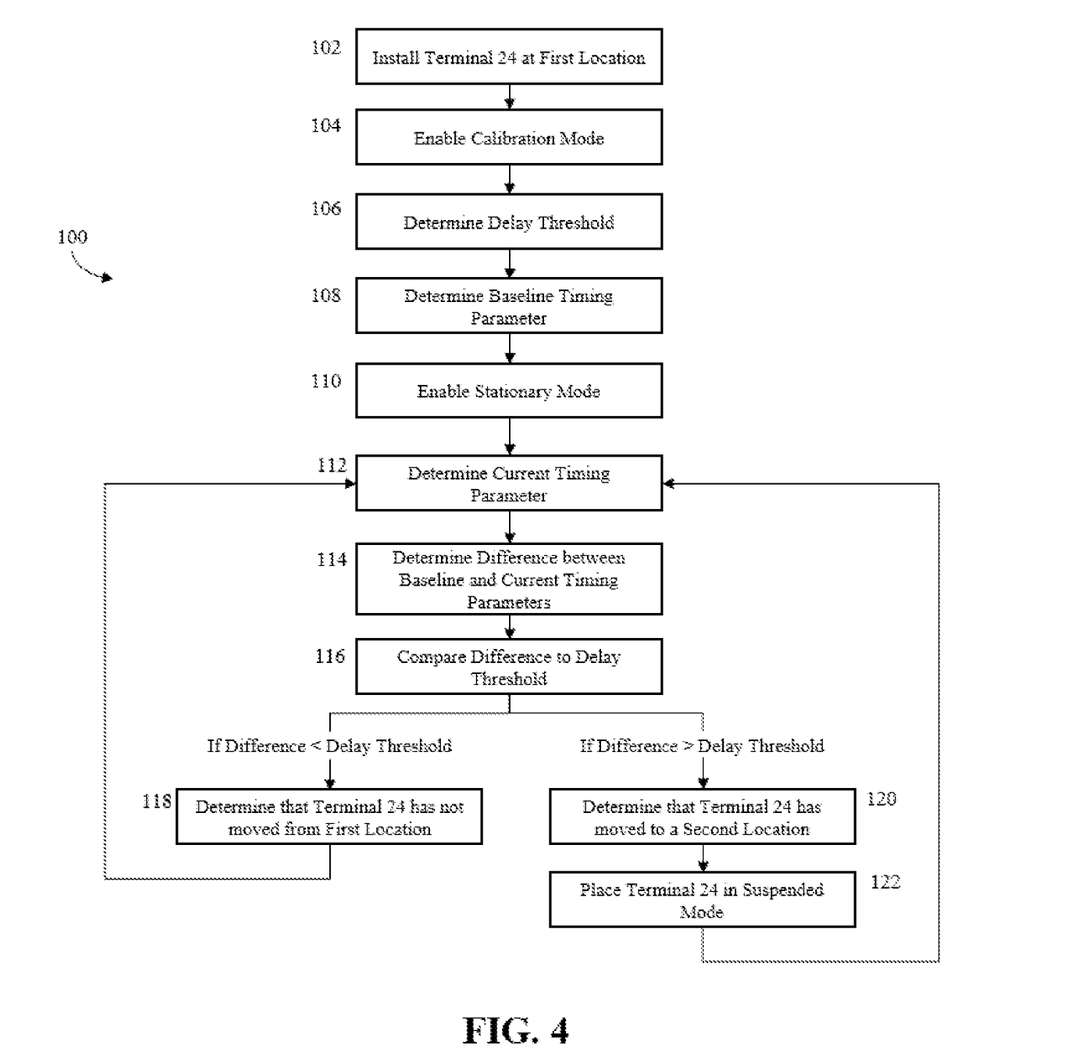
FIG. 4 illustrates an example embodiment of a method for managing access to a data network using the satellite communication network of FIG. 1 and/or the timing parameters of FIGS. 2 and 3.

FIG. 4 illustrates an example embodiment of a method 100 for managing access to a data network according to the present disclosure. Some or all of the steps of method 100 can be stored as instructions on the memory 22 and/or the memory 36 and can be executed by the controller 20 and/or the controller 34 in accordance with the respective instructions stored on the memory 22 and/or the memory 36. It should be understood that some of the steps described herein can be reordered or omitted without departing from the spirit or scope of method 100.

At step 102, the terminal 24 is installed at a first location. The first location is a physical location where the terminal 24 is authorized to be placed. The first location can be marked by first latitude or longitude coordinates. Installation of the terminal 24 at the first location can include installation of an antenna dish 30 at the first location. The installation can be performed by a technician of the provider of the terrestrial data network to be used by the terminal 24. More specifically, the installation can be performed by a technician of the provider of the network 10. Alternatively, the installation can be performed by the user of the terminal 24 at an authorized first location.

At step 104, the terminal 24 is placed in a calibration mode. While the terminal 24 is in the calibration mode, the first location of the terminal 24 can be established by the network 10. More specifically, the terminal 24 can be calibrated at the physical location where the terminal 24 resides at that time. This sets the physical location of the terminal 24 as the first location, such that movement from the first location will thereafter be detected by the network 10 in accordance with the methods discussed herein. In an embodiment, the terminal 24 can be manually placed in the calibration mode by the technician or user setting up the terminal 24. Alternatively, the terminal can be remotely placed in the calibration mode by the gateway 12. In an embodiment, the current latitude or longitude coordinates can be determined and/or entered at the terminal 24 and used to determine and/or calculate one or more of the time segments for use in the method 100.

At step 106, at least one communication signal is transmitted between the gateway 12 and the terminal 24. The at least one communication signal can be at least one first communication signal. The at least one first communication signal can include an outroute communication signal sent from the gateway 12 to the terminal 24 via the satellite 14. The at least one first communication signal can include an inroute communication signal sent from the terminal 24 to the gateway 12 via the satellite 14. Using the at least one first communication signal, the network 10 can determine a delay threshold (td). The delay threshold (td) can be a unit of time.

More specifically, the delay threshold can be based on the size of the frames at the gateway 12. The delay threshold (td) can be set at a value less than the largest frame size used by the gateway 12. In this way, the delay threshold (td) can account for a time delay that would occur if the largest frame at the gateway 12 is used for any given communication signal. The delay threshold (td) can also be set at a value larger than the smallest frame size used by the gateway 12. In an embodiment, the delay threshold (td) can be based on a percentage of the path delay.

In an embodiment, the at least one first communication signal transmitted for calibration at step 106 can include a flag which places the terminal 24 in the calibration mode. Thus, step 104 can be skipped and the terminal 24 can be placed in the calibration mode after receiving the at least one first communication signal at step 106.

At step 108, a baseline timing parameter is determined. The baseline timing parameter can be a baseline time segment which relates to a time period that the at least one first communication signal transmits between the terminal 24 and the gateway 12. The baseline time segment can include at least one of the time segments discussed herein. The baseline timing parameter can be determined from the at least one first communication signal transmitted between the gateway 12 and the terminal 24. More specifically, the baseline timing parameter can be determined based on timing marker information from the at least one first communication signal.

The baseline timing parameter can include an R-S-R propagation time ($T_{RSR\_base}$). In an embodiment, the baseline timing parameter can be a baseline R-S-R propagation time ($T_{RSR\_base}$) calculated as follows:

$$T_{RSR\_base} = T_{HO} - T_{HSH} - T_{RO}.$$

At the time of installation of the terminal 24, the hub offset time ($T_{HO}$) is known based on the at least one first communication signal. The hub offset time ($T_{HO}$) is generally known once the terminal 24 is placed in the first location. The terminal 24 can also determine an accurate value for the remote offset time ($T_{RO}$) based on the at least one first communication signal, because the terminal 24 needs to know the remote offset time ($T_{RO}$) accurately enough to be able to transit communication signals to the gateway 12 within the correct frame and timeslot.

The H-S-H propagation time ($T_{HSH}$) can be determined by the network 10. More specifically, the H-S-H propagation time ($T_{HSH}$) can be determined by the controller 20 of the gateway 12 and/or the controller 34 of the terminal 24. If satellite ephemeris information (e.g., timing and health) is available for the network 10 and/or the satellite 14, the network 10 can calculate the H-S-H propagation time ($T_{HSH}$) using the satellite ephemeris information. If satellite ephemeris is not available for the network 10 and/or the satellite 14, the network 10 can determine the H-S-H propagation time ($T_{HSH}$) based on the at least one first communication signal. The network 10 can periodically update an estimated H-S-H propagation time ($T_{HSH}$), for example, by monitoring the overall drift of timing of all the terminals 24 using polling responses. It should therefore be understood from this disclosure that the H-S-H propagation time ($T_{HSH}$) can have a small amount of error, though not enough to prevent calculations accurate enough to implement the present method 100.

The baseline R-S-R propagation time ($T_{RSR\_base}$) can be determined if the timing system is in a steady timing state. The terminal 24 is in a steady timing state, for example, when accurate satellite timing information can be determined. More specifically, the terminal is in a steady timing state when enough communication signal samples are being received at the terminal 24 from the satellite 14 that the H-S-H propagation time ($T_{HSH}$) can be accurately determined. The precise thresholds for determining whether the terminal 24 is in a steady timing state can vary with different types of systems 10, for example, depending on whether and what type of satellite ephemeris information is available.

If the timing system is not in a steady state, then the network 10 can wait until the timing system reaches a steady state to perform step 108. Step 108 can be delayed, for example, until the timing system enters the steady timing state. More specifically, step 108 can be delayed until the H-S-H propagation time ($T_{HSH}$) can be accurately determined.

At step 110, the terminal 24 is placed in a stationary mode. In the stationary mode, the terminal 24 can access the data network from the first location via the gateway 12. While the terminal 24 is in the stationary mode, the baseline timing parameter cannot be changed without authorization from the provider of the network 10. Also, while the terminal 24 is in the stationary mode, the terminal 24 cannot be moved from the first location without disrupting access to the terrestrial data network. As described in more detail below, if the terminal 24 is physically moved while in the stationary mode, then access to certain data via the terrestrial data network will be restricted at the new physical location.

At step 112, a current timing parameter is determined. The current timing parameter is determined while the terminal 24 is in the stationary mode. The current timing parameter can be a current time segment. More specifically, the current timing parameter can be a current time segment which relates to a time period that at least one communication signal transmits between the gateway 12 and the terminal 24. The current time segment can include at least one of the time segments discussed herein.

The current timing parameter can be determined from at least one communication signal transmitted between the gateway 12 and the terminal 24 while the terminal 24 is in the stationary mode. Thus, step 112 can include transmitting at least one communication signal between the gateway 12 and the terminal 24. The at least one communication signal can be at least one second communication signal. The at least one second communication signal can include an outroute communication signal sent from the gateway 12 to the terminal 24 via the satellite 14. The at least one second communication signal can also include an inroute communication signal sent from the terminal 24 to the gateway 12 via the satellite.

The current timing parameter can include a current R-S-R propagation time ($T_{RSR\_current}$). The current R-S-R propagation time ($T_{RSR\_current}$) can be determined when the timing system is in the steady timing state. If the timing system is not in the steady timing state, then step 112 can be delayed until the timing system enters the steady timing state. The current timing parameter can be calculated in the same way as the baseline timing parameter. In an embodiment, the current timing parameter can be a current R-S-R propagation time ($T_{RSR\_base}$) calculated as follows:

$$T_{RSR\_current} = T_{HO} - T_{HSH\_current} - T_{RO\_corrected}.$$

The hub offset time ($T_{HO}$) can be the same value used when calculating the baseline R-S-R propagation time ($T_{RSR\_base}$). The hub offset time ($T_{HO}$) can also be updated at the time of calculation of the current R-S-R propagation time ($T_{RSR\_current}$). As discussed above, the hub offset time ($T_{HO}$) is generally known based on the at least one communication signal. Thus, the hub offset time ($T_{HO}$) can be determined based on the at least one second communication signal.

The corrected remote offset time ($T_{RO\_corrected}$) can be calculated at the time of calculation of the current R-S-R propagation time ($T_{RSR\_current}$). As discussed above, the terminal 24 should have an accurate value for the corrected remote offset time ($T_{RO\_corrected}$) based on the at least one second communication signal, because the terminal 24 needs to know the corrected remote offset time ($T_{RO\_corrected}$) accurately enough to be able to transit communication signals to the gateway 12 within the correct timeslot. In an alternative embodiment, the corrected remote offset time ($T_{RO\_corrected}$) can be the same value as the remote offset time ($T_{RO}$) used when calculating the baseline R-S-R propagation time ($T_{RSR\_base}$ e).

The current H-S-H propagation time ($T_{HSH\_current}$) can depend on the position of the satellite 14 at the time of transmission of the at least one second communication signal. Thus, the current H-S-H propagation time ($T_{HSH\_current}$) can also be calculated based on the at least one second communication signal. As discussed above, if satellite ephemeris information (e.g., timing and health) is available for the network 10 and/or the satellite 14, the network 10 can calculate the H-S-H propagation time ($T_{HSH}$) using the satellite ephemeris information. Alternatively, if satellite ephemeris is not available for the network 10 and/or the satellite 14, the network 10 can determine the H-S-H propagation time ($T_{HSH}$) based on the at least one second communication signal.

At step 114, the current R-S-R propagation time ($T_{RSR\_current}$) is compared to the baseline R-S-R propagation time ($T_{RSR\_base}$). More specifically, a difference (D) between the current R-S-R propagation time ($T_{RSR\_current}$) and the baseline R-S-R propagation time ($T_{RSR\_base}$) is determined. The difference (D) can be calculated as the difference between the current R-S-R propagation time ($T_{RSR\_current}$) and the baseline R-S-R propagation time ($T_{RSR\_base}$). For example, the difference (D) can be calculated as follows:

$$D=|T_{RSR\_current}-T_{RSR\_base}|$$

At step 116, the difference (D) is compared to the delay threshold (td). If the difference (D) is less than the delay threshold (td) at step 116, then the difference (D) can possibly be attributed to the size of the frame(s) used for the at least one second communication signal. In this situation, the network 10 at step 118 can determine that the terminal 24 has not moved significantly from the first location. The method 100 can then return to step 112 and determine another difference (D) (e.g., a second difference (D)) between the baseline timing parameter and another current timing parameter determined based on at least one third communication signal transmitted between the gateway 12 and the terminal 24. More specifically, the method 100 can return to step 112 and determine another current R-S-R propagation time ($T_{RSR\_current}$) using the at least one third communication signal. As long as newly calculated difference (D) based on the next current timing parameter remains less than the delay threshold (td), the network 10 continues to determine that the terminal 14 remains at the first location. The current timing parameter can be repeatedly determined at regular intervals when the timing system is in the steady state. The current timing parameter can be repeatedly determined for as long as the terminal 24 is provided access to the terrestrial data network via the gateway 12.

If the difference (D) is greater than the delay threshold (td) at step 116, then the difference (D) cannot be attributed to the size of the frame(s) used for the at least one second communication signal. In this situation, the network 10 at step 120 can determine that the terminal 24 has moved significantly from the first location to a second location without authorization from the provider of the data network. Thus, the network 10 determines that the terminal 24 has been moved to the second location based on the current timing parameter determined using the at least one second communication signal. The second location can be defined as having second latitude or longitude coordinates which are different from the first latitude or longitude coordinates of the first location.

At step 122, the terminal 24 is placed in a suspended mode. In the suspended mode, access to the terrestrial data network from the terminal 24 is restricted. More specifically, the terminal 24 is at least partially restricted from accessing the terrestrial data network from the second location. The terminal 24 can be at least partially restricted, for example, by being partially limited from accessing the data network. The terminal 24 can also be at least partially restricted, for example, by being fully prevented from accessing the data network. For example, when an end user device 44 attempts to access the terrestrial data network using the terminal 24 while the terminal 24 is in the suspended mode, the user end user device 44 can be directed to an IP gateway (IPGW) which provides only partial data service to the end user device 44. In an embodiment, the IPGW can provide no service to the end user device 44 while the terminal 24 is in the suspended mode. The IPGW can be a Walled Garden IPGW as understood by those of ordinary skill in the art. In an embodiment, the Walled Garden IPGW can cause an explanatory message to be displayed on the end user device 44, for example, "Suspension due to illegal move."

With the terminal 24 in the suspended mode, the method 100 can return to step 112 and determine another difference (D) (e.g., a second difference (D)) between the baseline timing parameter and another current timing parameter determined based on at least one third communication signal transmitted between the gateway 12 and the terminal 24. More specifically, the method 100 can return to step 112 and determine another current R-S-R propagation time ($T_{RSR\_current}$). If the next newly calculated difference (D) based on another current timing parameter is less than the delay threshold (td), the network 10 can determine that the terminal 24 is in the first location. This way, if the terminal 24 was improperly placed in the suspended mode due to an inaccurate calculation, the suspended mode will only be temporary and will end as soon as the calculation is corrected. This also allows the user to place the terminal 24 back in the first location if the terminal 24 was improperly moved to a second location.

The network 20 can restore access to the data network by removing the terminal 24 from the suspended mode. More specifically, the system 10 can restore access to the data network by removing any restriction to the data network from the terminal 24. The network 10 can deactivate the suspended mode, for example, by redirecting the end user device from the Walled Garden IPGW to a service providing data IPGW.

In an embodiment, the system 10 can delay moving from step 120 to step 122 for a predetermined amount of time. For example, if the difference (D) is greater than the delay threshold (td) at step 116, the system 10 can provide a warning message to the user at step 120 that the terminal 24 has been determined to have moved significantly from the first location to a second location without authorization from the provider of the data network. The system 10 can then inform the user that access to the data network will be restricted if the terminal 24 is not moved back to the first location within the predetermined amount of time. The predetermined amount of time can be, for example, 24 hours. This way, the user has a chance to correct the issue before access to the data network via the terminal 24 is restricted.

In another embodiment, the system 10 must determine that a calculated difference (D) is greater than the delay threshold (td) a plurality of times before determining that the terminal 24 has moved at step 120 and/or activating the suspended mode at step 122. The plurality of times can be separated by a predetermined amount of time (e.g., an hour, 24 hours, etc.). For example, the system can require that the system twice perform steps 112, 114 and/or 116 an hour apart, thus twice determining that a newly calculated difference (D) is greater than the delay threshold (td) before placing the terminal in the suspended mode. This can avoid the terminal 24 being improperly placed in the suspended mode due to an inaccurate calculation the first time step 116 is performed, since the calculation can be redetermined and corrected without disrupting the user's access to the data network via the terminal 24.

In an embodiment, the provider of the terrestrial data network can remotely activate any of the modes discussed herein. For example, the provider can remotely activate the calibration mode if the user is permitted to move the terminal 24 to a new physical location. Then, once the terminal 24 is placed in the new physical location and a delay threshold (td) and/or a baseline timing parameter is calculated, the provider can remotely activate the stationary mode to ensure that the terminal 24 is not moved from the new physical location. The provider can also remotely activate the suspended mode for reasons not associated with the methods discussed herein. The provider can also remotely deactivate the suspended mode, for example, upon determination that a suspension was improper. The provider can remotely activate the modes discussed herein, for example, via the controller 20 of the gateway 12.

In an embodiment, if the baseline timing parameter is lost during use of the terminal 10, the method can return to step 106 and set a new baseline timing parameter.

The embodiments described herein provide improved systems and methods for managing access to a data network. The improved systems and methods enable the use of easily determined timing parameters to determine when a terminal connected to a terrestrial data network has been relocated without the approval of the provider. It should be understood that various changes and modifications to the systems and methods described herein will be apparent to those skilled in the art and can be made without diminishing the intended advantages.

The embodiments described herein can be employed in, for example, the Jupiter satellite system deployed by Hughes Network Systems, any existing or previous HN/HX satellite modem platforms by Hughes Network Systems, as well as any present or future consumer, enterprise, or military/DISD (Defense and Intelligence Systems Division) satellite modem design, or other type of communication system as understood in the art.

General Interpretation of Terms

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A method for managing access to a data network, the method comprising:
   determining a baseline timing parameter based on at least one first communication signal transmitted between a gateway and a terminal;
   determining a current timing parameter based on at least one second communication signal transmitted between the gateway and the terminal;
   calculating the difference between the baseline timing parameter and the current timing parameter; and
   restricting access of the terminal to the data network when the difference between the baseline timing parameter and the current timing parameter exceeds a delay threshold, the restricting access to the data network including providing only partial data service to an end user device operatively connected to the terminal.

2. The method of claim 1, wherein
   at least one of the at least one first communication signal and the at least one second communication signal includes
   an outroute communication signal transmitted from the gateway to the terminal via a satellite, and
   an inroute communication signal transmitted from the terminal to the gateway via the satellite.

3. The method of claim 1, further comprising
   determining the delay threshold based on a frame size used by the gateway.

4. The method of claim 1, further comprising
   after determining the baseline timing parameter, placing the terminal in a stationary mode in which the baseline timing parameter cannot be changed.

5. The method of claim 1, wherein
determining the baseline timing parameter includes calculating the baseline timing parameter using at least one of: (i) a hub offset time ($T_{HO}$); (ii) a remote offset time ($T_{RO}$); (iii) a hub-satellite propagation time ($T_{HS}$); (iv) a satellite-remote propagation time ($T_{SR}$); (v) a remote-satellite propagation time ($T_{RS}$); (vi) a satellite-hub propagation time ($T_{SH}$); (vii) a hub-satellite-hub propagation time ($T_{HSH}$); and/or (viii) a remote-satellite-remote propagation time ($T_{RSR}$).

6. The method of claim 1, wherein
the baseline timing parameter relates to a time period that the at least one first communication signal transmits between the gateway and the terminal, and
the current timing parameter relates to a time period that the at least one second communication signal transmits between the gateway and the terminal.

7. A method for managing access to a data network, the method comprising:
determining a baseline timing parameter based on at least one first communication signal transmitted between a gateway and a terminal;
determining a current timing parameter based on at least one second communication signal transmitted between the gateway and the terminal;
calculating the difference between the baseline timing parameter and the current timing parameter;
determining a delay threshold based on a frame size used by the gateway, the delay threshold set to be smaller than a largest frame size used by the gateway; and
restricting access of the terminal to the data network when the difference between the baseline timing parameter and the current timing parameter exceeds the delay threshold.

8. The method of claim 7, wherein
restricting access to the data network includes providing only partial data service to an end user device operatively connected to the terminal.

9. A method for managing access to a data network, the method comprising:
determining a baseline timing parameter based on at least one first communication signal transmitted between a gateway and a terminal;
determining a current timing parameter based on at least one second communication signal transmitted between the gateway and the terminal;
calculating the difference between the baseline timing parameter and the current timing parameter;
restricting access of the terminal to the data network when the difference between the baseline timing parameter and the current timing parameter exceeds a delay threshold;
after restricting access to the data network, calculating a second difference between the baseline timing parameter and another current timing parameter determined based on at least one third communication signal transmitted between the gateway and the terminal; and
restoring access to the data network if the second difference between the baseline timing parameter and the another current timing parameter is less than the delay threshold.

10. A method for managing access to a data network, the method comprising:
enabling a terminal located at a first location to access the data network via a gateway;
after the terminal has accessed the data network from the first location, transmitting at least one communication signal between the gateway and the terminal;
determining that the terminal has been moved to a second location based on a timing parameter determined using the at least one communication signal; and
restricting access of the terminal to the data network from the second location, the restricting access to the data network including providing only partial data service to an end user device operatively connected to the terminal.

11. The method of claim 10, wherein
the first location is located at a different latitude or longitude coordinate than the second location.

12. The method of claim 10, wherein
the at least one communication signal includes an outroute communication signal transmitted from the gateway to the terminal via a satellite and an inroute communication signal transmitted from the terminal to the gateway via the satellite.

13. The method of claim 10, wherein
the timing parameter includes a time segment calculated based on a transmission time of the at least one communication signal between the terminal and the gateway.

14. A method for managing access to a data network, the method comprising:
enabling a terminal located at a first location to access the data network via a gateway;
after the terminal has accessed the data network from the first location, transmitting at least one first communication signal between the gateway and the terminal;
determining that the terminal has been moved to a second location based on a first timing parameter determined using the at least one first communication signal;
restricting access of the terminal to the data network from the second location;
after access of the terminal to the data network has been restricted, transmitting at least one second communication signal between the gateway and the terminal;
determining that the terminal is in the first location based on a second timing parameter determined using the at least one second communication signal; and
restoring access of the terminal to the data network from the first location.

15. The method of claim 14, wherein
restricting access to the data network includes providing only partial data service to an end user device operatively connected to the terminal.

16. A communication network comprising:
a terminal located in a first location;
a gateway in remote communication with the terminal, the gateway configured to enable the terminal to access a data network; and
a controller configured to (i) determine that the terminal has been moved to a second location based on a timing parameter determined from at least one communication signal transmitted between the gateway and the terminal, and (ii) cause access of the terminal to the data network to be restricted from the second location by providing only partial data service to an end user device operatively connected to the terminal.

17. The communication network of claim 16, wherein
the terminal or the gateway includes the controller.

18. The communication network of claim 16, further comprising
  a satellite configured to enable transmission of the at least one communication signal between the gateway and the terminal.

19. The communication network of claim 16, wherein
  the controller is configured to calculate the timing parameter based on a transmission time of the at least one communication signal between the gateway and the terminal.

20. A communication network comprising:
  a terminal located in a first location;
  a gateway in remote communication with the terminal, the gateway configured to enable the terminal to access a data network; and
  a controller configured to (i) determine that the terminal has been moved to a second location based on a first timing parameter determined from at least one first communication signal transmitted between the gateway and the terminal, (ii) cause access of the terminal to the data network to be restricted from the second location, (iii) after causing access of the terminal to the data network to be restricted from the second location, determine that the terminal is in the first location based on a second timing parameter determined from at least one second communication signal, and (iv) restore access of the terminal to the data network from the first location.

\* \* \* \* \*